US007924831B2

(12) United States Patent
Seok (10) Patent No.: US 7,924,831 B2
(45) Date of Patent: Apr. 12, 2011

(54) PROCEDURE OF SETTING UP PEER LINK IN WIRELESS MESH NETWORK AND WIRELESS STATION SUPPORTING THE SAME

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 12/263,318

(22) Filed: Oct. 31, 2008

(65) Prior Publication Data

US 2009/0116410 A1    May 7, 2009

(30) Foreign Application Priority Data

Nov. 1, 2007    (KR) .................. 10-2007-0111216

(51) Int. Cl.
  *H04L 12/28*    (2006.01)
(52) U.S. Cl. ........................................ 370/389; 375/219
(58) Field of Classification Search .................. 370/389, 370/400; 375/219
  See application file for complete search history.

(56) References Cited

U.S. PATENT DOCUMENTS

| 2006/0182073 | A1  | 8/2006  | Pani et al. |
| 2007/0099624 | A1  | 5/2007  | Guo |
| 2007/0140279 | A1* | 6/2007  | Yang et al. ............... 370/406 |
| 2007/0248104 | A1* | 10/2007 | Rudolf et al. ............. 370/400 |
| 2007/0291829 | A1* | 12/2007 | Nabetani et al. .......... 375/219 |
| 2009/0023453 | A1* | 1/2009  | Hu et al. .................. 455/452.1 |

OTHER PUBLICATIONS

Anonymous: "IEEE P802.11n/D2.00" Draft Standard, Feb. 2007, pp. 60-67, 78-79, 198-202, XP002513174.
Yongho Seok, Alexander Safonov: "Normative Text for High Throughput Mesh" IEEE P802.11 Wireless LANs, Nov. 13, 2007 pp. 1-5, XP002513175.
Zhanping Yin and Victor C.M. Leung: "Third-Party Handshake Protocol for Efficient Peer Discovery in IEEE 802.15.3 WPANs" Broadband Networks, 2005 2nd International Conference on Boston, MA Oct. 3-7, 2005 Piscataway, NJ, USA, IEEE, Oct. 3, 2005, pp. 902-911, XP010890303, ISBN: 978-0-7803-9276-2.
Faccin, S.M., et al., "Mesh WLAN Networks: Concept and System Design," Wireless Mesh Networking, IEEE Wireless Communications, pp. 10-11, Apr. 2006.

* cited by examiner

*Primary Examiner* — Dang T Ton
*Assistant Examiner* — Wei Zhao
(74) *Attorney, Agent, or Firm* — Lee, Hong, Degerman, Kang & Waimey

(57) ABSTRACT

Provided are a procedure of setting up a peer link in wireless mesh networks and a wireless station supporting the procedure. In the procedure, a mesh point (MP) transmits first peer link open frame regarding the peer link to a candidate peer MP. The first peer link open frame includes high throughput capabilities information element and high throughput operation information element. And, the mesh point receives first peer link confirmation frame regarding the peer link from the candidate peer MP in response to the first peer link open frame. And, the mesh point transmits second peer link confirmation frame regarding the peer link to the candidate peer MP after receiving second peer link open frame received from the candidate peer MP. In this case, the peer link confirmation frame may also include high throughput capabilities information element and high throughput operation element.

6 Claims, 7 Drawing Sheets

| Order | Information | Notes |
|---|---|---|
| 1 | Category | Notes |
| 2 | Action Value | |
| 3 | Capability | |
| 4 | Supported rates | |
| 5 | Extended Supported Rates | The Extended Supported Rates element is present whenever there are more than eight supported rates, and it is optional otherwise. |
| 6 | Power Capability | The Power Capability element shall be present if dot11SpectrumManagementRequired is true. |
| 7 | Supported Channels | The Supported Channels element shall be present if dot11SpectrumManagementRequired is true. |
| 8 | RSN | The RSN information element is only present within Peer Link Open frames generated by MPs that have dot11RSNAEnabled set to TRUE. |
| 9 | QoS Capability | The QoS Capability element is present when dot11QoS-OptionImplemented is true. |

FIG. 5

| Order | Information | Notes |
|---|---|---|
| 10 | Mesh ID | The Mesh ID information element is present when dot11MeshEnabled is true. |
| 11 | Mesh Configuration | The Mesh Configuration information element is present when dot11MeshEnabled is true. |
| 12 | Peer Link Management | The Peer Link Management information element is present only when dot11MeshEnabled is true. The subtype of the Peer Link Management Element is set to 0. |
| 13 | MSCIE | The MSCIE element is present when dot11MeshEnabled is true. |
| 14 | MSAIE | The MSAIE element is present when dot11MeshEnabled is true. |
| 15 | MIC | This field is present when dot11MeshEnabled is true and the abbreviated handshake is enabled |
| 16 | HT Capabilities | (Mandatory) The HT Capabilities element is present when dot11HighThroughputOptionImplemented attribute is true |
| 17 | Extended Capabilities | (Optional) The Extended Capabilities element shall be present if the dot11 2040BSSCoexistenceManagementSupport attribute is true and may not be present otherwise. |
| 18 | 20/40 BSS Coexistence | (Optional) The 20/40 BSS Coexistence element may appear in this frame. |
| Last | Vendor Specific | One or more vendor-specific information elements may appear in this frame. This information element follows all other information elements. |

FIG. 6

| Order | Information | Notes |
|---|---|---|
| 1 | Category | |
| 2 | Action Value | |
| 3 | Capability | |
| 4 | Status code | |
| 5 | AID | |
| 6 | Supported rates | |
| 7 | Extended Supported Rates | The Extended Supported Rates element is present whenever there are more than eight supported rates, and it is optional otherwise. |
| 8 | RSN | The RSN information element is only present when dot11RSNAEnabled is set to TRUE. |
| 9 | EDCA Parameter Set | |
| 10 | Mesh ID | The Mesh ID information element is present when dot11MeshEnabled is true. |
| 11 | Mesh Configuration | The Mesh Configuration information element is present when dot11MeshEnabled is true. |

FIG. 7

| Order | Information | Notes |
|---|---|---|
| 12 | Peer Link Management | The Peer Link Management information element is present only when dot11MeshEnabled is true. The subtype of the Peer Link Management Element is set to 1. |
| 13 | MSCIE | The MSCIE element is present when dot11MeshEnabled is true. |
| 14 | MSAIE | The MSAIE element is present when dot11MeshEnabled is true. |
| 15 | MIC | This field is present when dot11MeshEnabled is true and the abbreviated handshake is enabled |
| 16 | HT Capabilities | (Mandatory) The HT Capabilities element is present when dot11HighThroughputOptionImplemented attribute is true |
| 17 | HT Information | (Mandatory) The HT Information element is included by an AP when dot11HighThroughputOptionImplemented attribute is true |
| 18 | Extended Capabilities | (Optional) The Extended Capabilities element shall be present if the dot112040BSSCoexistenceManagementSupport attribute is true and may be present otherwise. |
| 19 | 20/40 BSS Coexistence | (Optional) The 20/40 BSS Coexistence element may appear in this frame. |
| 20 | Overlapping BSS Scan Parameters | (Optional) The Overlapping BSS Scan Parameters element may be present only if the dot11FortyMHzOptionImplemented attribute is true. |
| Last | Vendor Specific | One or more vendor-specific information elements may appear in this frame. This information element follows all other information elements. |

PROCEDURE OF SETTING UP PEER LINK IN WIRELESS MESH NETWORK AND WIRELESS STATION SUPPORTING THE SAME

CROSS-REFERENCE TO RELATED PATENT APPLICATIONS

This application claims the benefit of Korean Patent Application No. 10-2007-0111216 filed on Nov. 1, 2007 in the Korean Intellectual Property Office, the disclosure of which is incorporated herein in its entirety by reference.

BACKGROUND

1. Field of the Invention

The present invention relates to a wireless local access network (WLAN), and more particularly, to a procedure of setting up a mesh peer link in a wireless mesh network and a wireless station supporting the procedure.

2. Description of the Related Art

With the recent development of information communication technology, a variety of wireless communication technology has been developed. A WLAN is the technology permitting wireless access to Internet in home or companies or specific service areas by the use of portable terminals such as a personal digital assistant (PDA), a laptop computer, and a portable multimedia player (PMP) on the basis of a radio frequency technology.

The IEEE (Institute of Electrical and Electronics Engineers) 802 which is a standardization of the WLAN technology established in February, 1980 has carried out much standardization work. In the initial WLAN technology, a data rate of 1 to 2 Mbps was supported by the use of frequency hopping, spread spectrum, and infrared communication using a frequency of 2.4 GHz in accordance with the IEEE 802.11. In recent years, 54 Mbps in maximum can be supported by the use of the orthogonal frequency division multiplex (OFDM) technology to the WLAN. In addition, the IEEE 802.11 has developed or is developing a variety of technical standards for improvement in quality of service (QoS), compatibility of an access point (AP) protocol, security enhancement, wireless resource measurement, wireless access in vehicular environment, fast roaming, wireless mesh network, inter-working with external networks, wireless network management, and the like.

The "wireless mesh network" can support direct communication between plural wireless stations having a relay function. In view of functionality, a distribution system (DS) for plural APs can be replaced with an inter-operable wireless link or a multi-hop path between the plural wireless stations. In the mesh network, one wireless station can set up a peer-to-peer wireless link with one or more neighboring wireless stations, thereby constructing a more flexible network.

In the wireless mesh network, one wireless station can establish plural peer links with each of other wireless stations. Thus, plural communication paths can exist between two wireless stations. Among them, the direct communication paths between two wireless stations are called a wireless mesh link or a mesh peer link or a peer link. The wireless stations are called mesh points (MP), which is only an example. A wireless station performing the function of an AP is called mesh access point (MAP).

Such a wireless mesh network has advantages such as flexibility in constructing a network, reliability due to bypass paths, reduction in power consumption due to a decrease in communication distance. More specifically, it is possible to construct a flexible network by using the mesh network even in places not including any wired communication network. In the mesh network, the plural MPs can be connected to each other to guarantee plural bypass paths. Accordingly, even when one MP is out of order, data can be transmitted through another path. In the mesh network, since the communication can be made through a neighboring MP, it is possible for terminals to communicate with low power.

On the other hand, the IEEE 802.11n is a technical standard made in relatively recent years to overcome the limit in communication speed, which is a weak point of the WLAN. The IEEE 802.11n is designed to enhance the speed and reliability of the network and to extend the operating coverage of the wireless network. More specifically, the IEEE 802.11n supports high throughput (HT) in which the data processing rate is 54 Mbps in maximum and is based on the MIMO (Multiple Inputs and Multiple Outputs) technology employing multiple antennas at the transmitter and/or the receiver to minimize transmission errors and to optimize the data rate. The standard employs a coding scheme in which several copies are transmitted to enhance the reliability of data and may employ the orthogonal frequency division multiplex (OFDM) scheme to enhance the speed.

SUMMARY OF THE INVENTION

In order to allow the MPs supporting the IEEE 802.11n (hereinafter, referred to as "HT MP") to utilize the high throughput (HT) PHY/MAC characteristics in the wireless mesh network, a mesh peer link should be first set up between the MPs. When the mesh peer link is set up between the HT MPs by the use of the procedure like allowing legacy MPs, which does not support the IEEE 802.11n, to set up the mesh peer link, various HT PHY/MAC characteristics required for accomplishing the data rate of 100 Mbps or more cannot be used.

For example, in order to set up the mesh peer link between the HT MPs and to transmit data through the setup mesh peer link, the mesh profiles of the two HT MPs are equal to each other. However, in the current mesh peer link setup procedure, the method of allowing an HT MP intending to set up a peer link to know information on the opposite HT MP, which is required for using the HT PHY/MAC characteristics, is not defined.

Therefore, a goal of the invention is to provide a procedure of setting up a mesh peer link in a wireless mesh network and a wireless station supporting the procedure, which can allow HT MPs having set up the mesh peer link to utilize the HT PHY/MAC characteristics.

According to an aspect of the invention, there is provided a procedure of setting up a peer link in wireless mesh networks, the procedure including: transmitting first peer link open frame regarding the peer link to a candidate peer mesh point (MP), the first peer link open frame including high throughput capabilities information element; receiving first peer link confirmation frame regarding the peer link from the candidate peer MP in response to the first peer link open frame; and transmitting second peer link confirmation frame regarding the peer link to the candidate peer MP in response to second peer link open frame received from the candidate peer MP, the peer link confirmation frame including high throughput capabilities information element.

According to another aspect of the invention, there is provided a procedure of setting up a peer link between first mesh point (MP) and second MP in wireless mesh networks, the procedure including: allowing the first MP to send first peer link open frame to the second MP and the second MP to send second peer link open frame to the first MP, both the first and second peer link open frames including high throughput capabilities information element and high throughput operation information element, and allowing the first MP to send second peer link confirmation frame to the second MP in response to the received second peer link open frame and the second MP to send first peer link confirmation frame to the first MP in response to the received first peer link open frame, both the first and second peer link confirmation frames including high throughput capabilities information element and high throughput operation information element.

According to another aspect of the invention, there is provided a wireless station for supporting a procedure of setting up a peer link in wireless mesh networks, the wireless station comprising: a processor configured to generate and process frames; and a transceiver operably connected to the processor and configured to transmit and receive the frames for the processor, wherein the wireless station is configured to transmit first peer link open frame regarding the peer link to a candidate peer mesh point (MP), the first peer link open frame including high throughput capabilities information element, to receive first peer link confirmation frame regarding the peer link from the candidate peer MP in response to the first peer link open frame, and to transmit second peer link confirmation frame regarding the peer link to the candidate peer MP in response to second peer link open frame received from the candidate peer MP, the second peer link confirmation frame including high throughput capabilities information element.

BRIEF DESCRIPTION OF THE DRAWINGS

The above and other features and advantages of the present invention will become more apparent by describing in detail exemplary embodiments thereof with reference to the attached drawings in which.

DESCRIPTION OF THE EXEMPLARY EMBODIMENTS

Hereinafter, an embodiment of the invention will be described with reference to the accompanying drawings.

Figure 1:
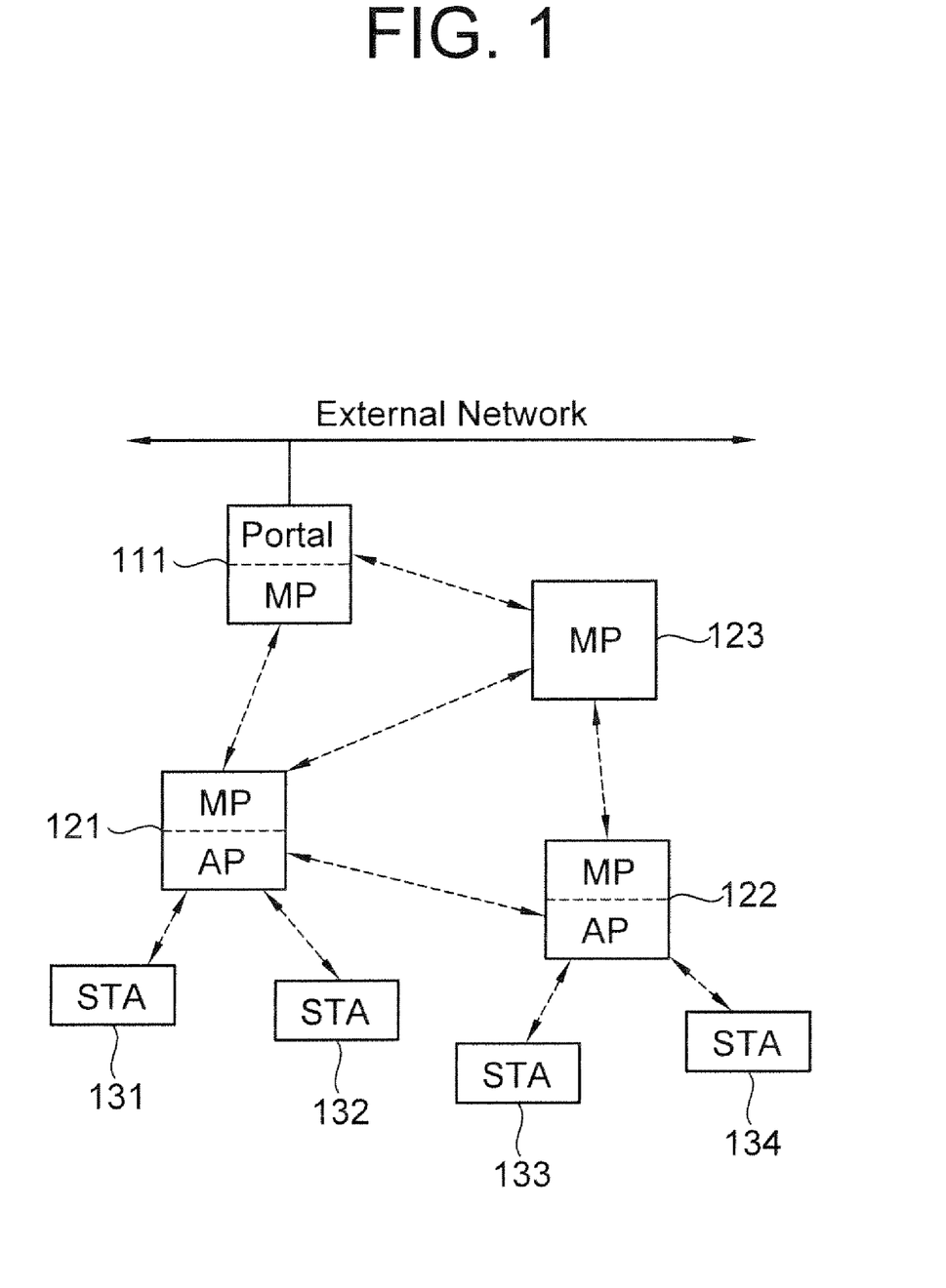
FIG. 1 is a diagram illustrating a configuration of a wireless mesh network.

FIG. 1 is a diagram illustrating a configuration of a wireless mesh network. A wireless mesh network has a pre-determined mesh identifier, which is used as a title for identifying a group of MPs constituting the wireless mesh network. A method of giving the mesh identifier is not limited.

Referring to FIG. 1, the wireless mesh network includes one or more STAs 131, 132, 133, and 134 and one or more wireless stations, that is, MPs 110, 121, 122, and 123. Reference numerals 121 and 122 indicate MPs performing the function of an AP, that is, MAPs, since the STAs 131, 132, 133, and 134 associated therewith exist. Reference numeral 121 indicates an MP connected to an external network by wired or by wireless, which is called a mesh portal.

Each of the STAs 131 to 134 is any device that contains an IEEE 802.11-conformant medium access control (MAC) and a physical layer (PHY) interface to the wireless medium. Each of the STAs 131 to 134 is non-AP STA which is not AP STA. The STAs 131 to 134 notify their multi-cast subscription information element to the MAP 121 or 122. The STAs may be called wireless station, wireless transmitting/receiving unit (WTRU), user equipment (UE), mobile station (MS), or mobile subscriber unit.

The MPs 110, 121, 122, and 123 are entities constituting the wireless mesh network and are functional entities according to the IEEE 802.11 including the MAC and PHY interfaces according to the IEEE 802.11 standard. The MPs 110, 121, 122, and 123 are wireless devices supporting a mesh service. The mesh service includes all services permitting the direct communication between the MPs in the mesh network. The communication between the MPs for providing the mesh service, for example, the MP 121 and the MP 123, is made through a mesh link or a peer link as the direct link set up between two MPs. According to the embodiment of the invention, the MPs 110, 121, 122, and 123 support one or more HT MAC/PHY characteristics so as to accomplish a data processing rate of 100 Mbps or more.

In order to allow two or more MPs to set up peer links with each other to form a mesh network or to allow a different MP to participate in an existing mesh network, the mesh profiles of the MPs to set up the peer links should be necessarily equal to each other. The MPs support at least one mesh profiles. The mesh profile includes a mesh ID, a path selection protocol ID, and a path selection metric ID. The mesh profile may further include a congestion control mode ID.

As described above, an MP also having the function of an AP is particularly called an MAP. Accordingly, the MAPs 121 and 122 also perform the function of an AP for wireless stations associated therewith. The AP may be called convergence controller, base station (BS), node-B, or site controller, in addition to the title of access point.

Since the mesh profiles of the MPs should be necessarily equal to each other to participate in a mesh network for communication, the MPs should have sufficient information element on themselves and the neighboring MPs. Procedures of allowing an MP to participate in a mesh network, to detect the change in connectivity in the mesh network, and to react with the change include a mesh discovery procedure and a mesh peer link management procedure in the mesh network. The mesh discovery procedure is to allow an MP to discover latent neighboring MPs by passive scanning using beacon frames transmitted from the neighboring MPs or active scanning using the exchange of probe request frames and probe response frames between two MPs and to discover neighboring MPs having the same mesh profile among the latent neighboring MPs. The mesh peer link management procedure is used to set up the peer links between the MPs, to manage the peer links, and to tear down the peer links.

As described above, the mesh discovery procedure is designed to detect candidate peer MPs and characteristics thereof and includes procedures before and after the MPs participate in the mesh network. The configured MP has at least one mesh profile. When the MP is a member of a specific mesh network, one mesh profile is accurately activated.

The mesh discovery procedure for discovering the neighboring MPs includes allowing the MP to perform passive or active scanning. In case of the active scanning, a first MP transmits a probe request frame including the mesh ID information. Only second MPs having the same mesh ID information among the MPs having received the probe request frame transmits a probe response frame in response thereto. The probe response frame includes a mesh configuration element. The first MP can know profile information of the second MPs having transmitted the probe response frame on the basis of the information included in the mesh configuration element.

Figure 2:
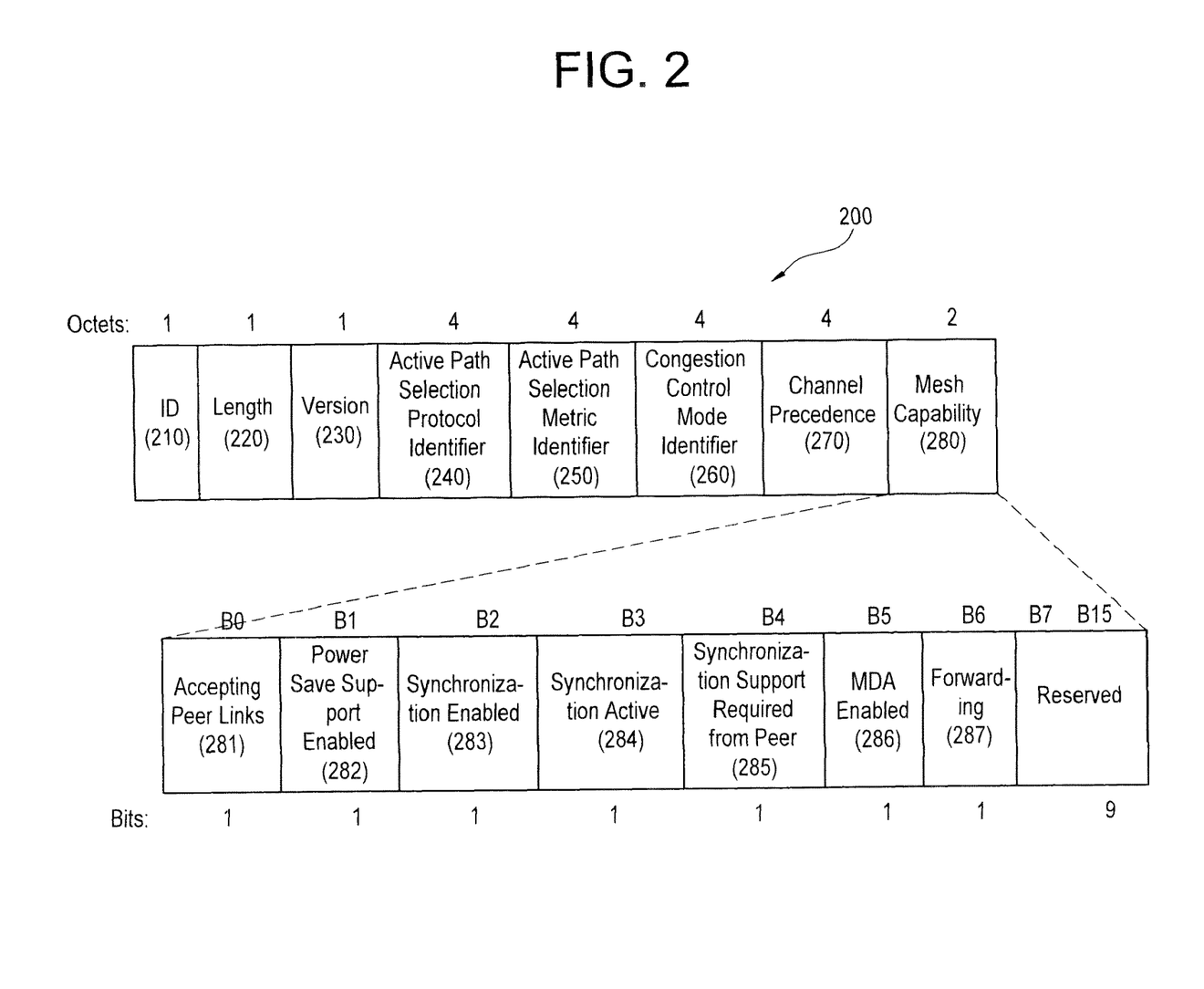
FIG. 2 is a diagram illustrating a format of a mesh configuration element that can be included in a probe response frame.

FIG. 2 is a diagram illustrating a format of a mesh configuration element 200 included in the probe response frame. Referring to FIG. 2, the mesh configuration element 200 includes an ID field 210, a length field 220, a version field 230, an active path selection protocol ID field 240, an active path selection metric ID field 250, a congestion control mode ID field 260, a channel precedence field 270, and a mesh capability field 280.

The ID field 210 is set to a value indicating the mesh configuration element. The length field 220 is set to a value indicating the length of the element 200. The version field 230 is set to a value indicating the version of the element 200. The active path selection protocol ID field 240 is set to a value indicating a path selection protocol used for the MP to generate current path selection information. The active path selection metric ID field 250 is set to a value indicating a path metric currently used in the path selection protocol activated in the mesh network. The congestion control mode ID field 260 is set to a value indicating a congestion control protocol currently used. The channel precedence field 270 is set to a value indicating the channel precedence in a unified channel graph to which the MP PHY belongs.

The mesh capability field 280 includes a variety of information indicating whether an MP could be a candidate for setting up a peer link. Referring to FIG. 2, the mesh capability field 280 includes a peer link accepting subfield 281 indicating whether the MP can set up and has an intention to set up a peer link with another MP, a power save support enable subfield 282 indicating whether a power save mode is supported and whether the peer link could be held in the power save mode, a synchronization enable subfield 283 indicating whether the synchronization with the peer MP is supported, a synchronization active subfield 284 indicating whether the MP is a currently-synchronized MP, a synchronization support request subfield 285 indicating whether the trial to communicate for synchronization is requested to the peer MP, an MDA enable subfield 286 indicating whether a mesh deterministic access (MDA) service is supported, and a forwarding subfield 287.

Another mesh discovery procedure for discovering the neighboring MPs uses beacon frames periodically transmitted from the neighboring MPs. Since beacon frames transmitted from the MPs in the mesh network include the mesh ID information and the mesh configuration information, the MP receiving the beacon frames can know the mesh profile of the transmitting MP. The mesh configuration information included in the beacon frame is substantially the same as the information included in the probe request frame or the probe response frame and thus detailed description thereof is omitted.

When an MP discovers the neighboring MPs using one of the above-mentioned mesh discovery procedures, the MP tries to perform the mesh link setup procedure with the discovered neighboring MPs. The mesh link setup procedure is to set up logical links between the MPs and is a procedure for setting up peer links between the MPs, which is also called a peering procedure. In the mesh network, the MPs can transmit and receive data frames or management frames (except for management frames for the mesh discovery procedure or the peer link management procedure) after the mesh peer links are set up by the peering procedure. The MPs transmit and receive a peer link open frame and a peer link confirmation frame to set up the mesh peer links between the MPs.

Figure 3:
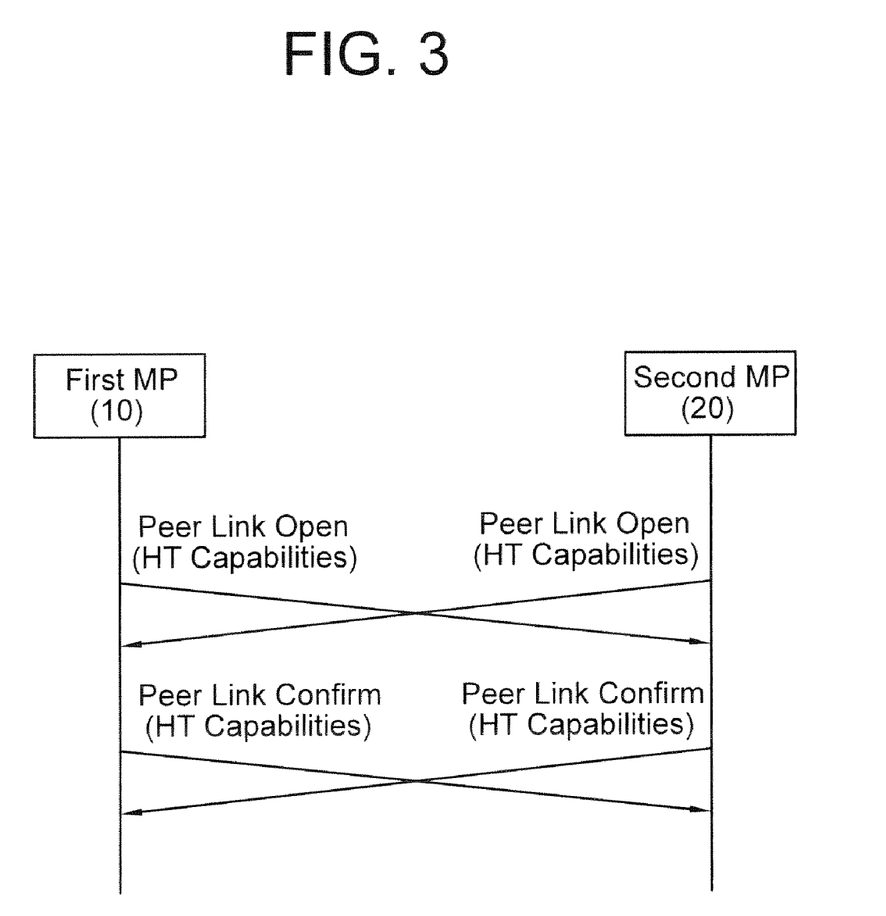
FIG. 3 is a diagram illustrating a flow of messages in a mesh peer link setup procedure according to an embodiment of the invention.

FIG. 3 is a diagram illustrating a flow of messages in the mesh link setup procedure according to the embodiment of the invention.

Referring to FIG. 3, a first MP 10 transmits a first peer link open frame to a second MP 20 and receives a first peer link confirmation frame from the second MP 20 in response to the first peer link open frame. The second MP 20 transmits a second peer link open frame to the first MP 10 and receives a second peer link confirmation frame from the first MP 10 in response to the second peer link open frame.

The sequence for transmitting and receiving the first peer link open and confirmation frames and the second peer link open and confirmation frames is not particularly limited. For example, the first MP 10 may transmit the first peer link open frame before or after receiving the second peer link open frame from the second MP 20, and may transmit the second peer link open frame before or after transmitting a second peer link response frame to the second MP 20 as a response to the second peer link open frame.

According to this embodiment, the first and second peer link open frames and the first and second peer link confirmation frames transmitted between the first MP 10 and the second MP 20 include capability information of a wireless station associated with the HT service, for example, HT capability information. That is, the peer link open and confirmation frames include one or more capability information supported by the MP among the HT capabilities associated with the HT service.

Figure 4:
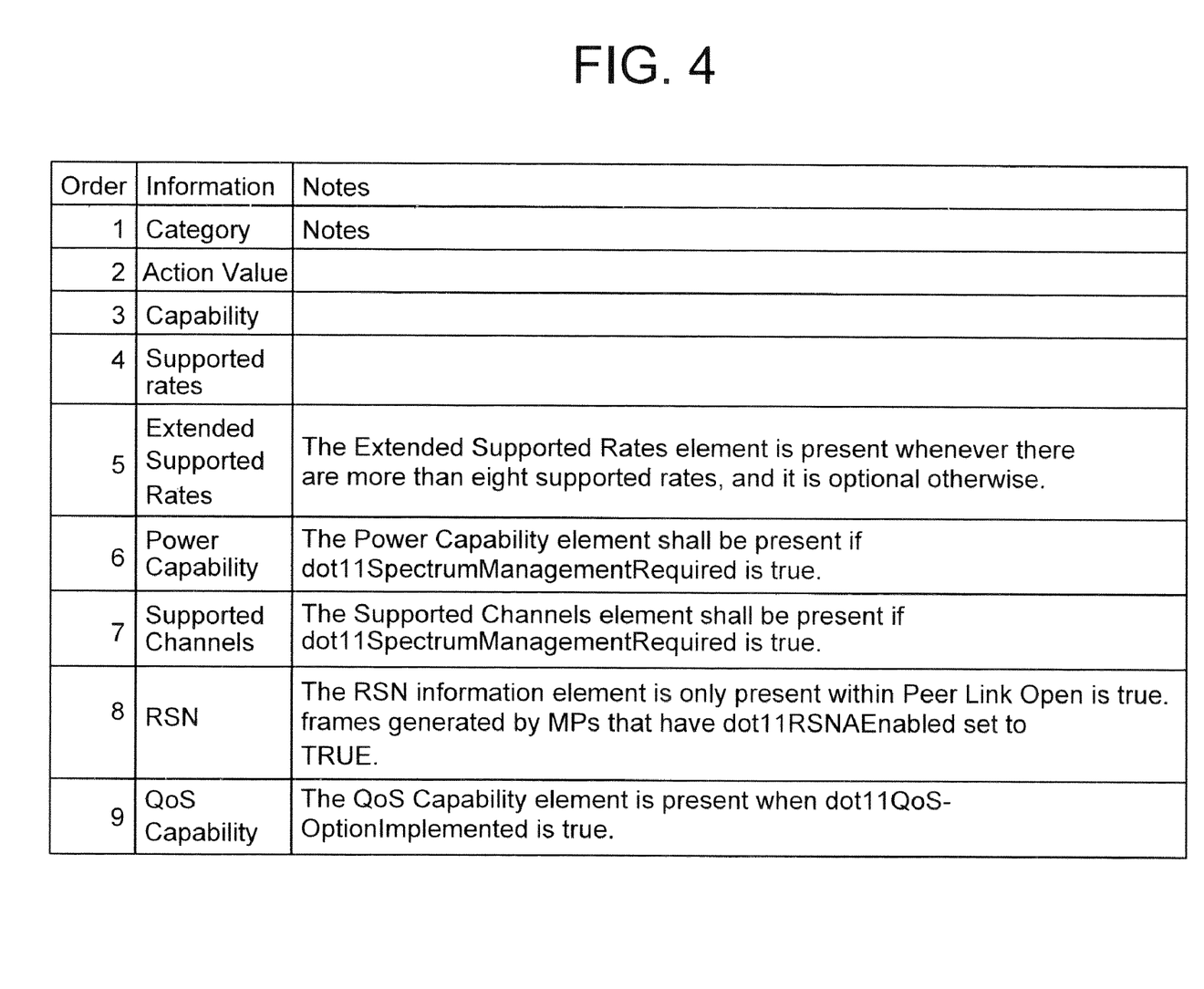
FIG. 4 is a diagram illustrating a part of information element included in a body portion of a peer link open frame that is used for the mesh peer link setup procedure according to the embodiment of the invention.
Figure 5:
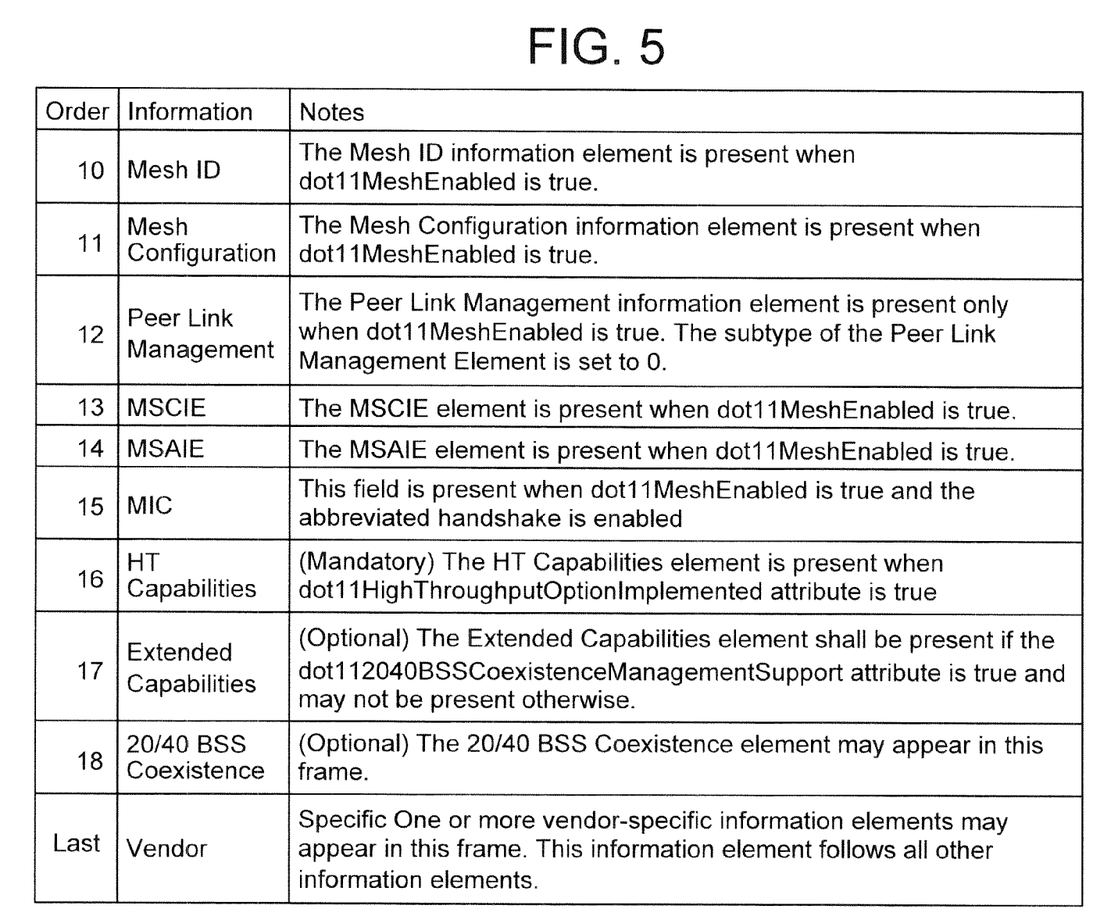
FIG. 5 is a diagram illustrating another part of information element included in the body portion of the peer link open frame that is used for the mesh peer link setup procedure according to the embodiment of the invention.

FIGS. 4 and 5 are diagrams examples of information element included in a body portion of the peer link open frame used in the mesh peer link setup procedure according to the embodiment of the invention. As described above, the peer link open frame is used to start the mesh link setup procedure.

Referring to FIGS. 4 and 5, the body portion of the peer link open frame includes information on category, action value, capability, and supported rate. When a predetermined condition is satisfied, the body portion may further include information on extended support rate, power capability, supported channel, robust security network (RSN), QoS capability, mesh ID, mesh configuration, peer link management, mesh security capability information element (MSCIE), mesh security association handshake information element (MSAIE), and message integration code.

When the MP transmitting the peer link open frame is an MP supporting the HT PHY and MAC, that is, an HT MP, the body portion of the peer link open frame includes the HT capability information element and may further include extended capability information element and 20/40 BSS coexistence information element. The body portion of the peer link open frame may further include HT information element or HT operation information element. The HT information element or the HT operation information element includes information for controlling the operation of the HT MP in the BSS.

The HT capability information element is used to notify to the opposite MP that the HT MP supports the HT MAC and PHY. In an aspect of this embodiment, the HT capability information element should be necessarily included in the peer link open frame to use the HT service in the mesh network. That is, the HT MP transmits to the opposite MP the HT capability information element indicating that it supports the HT MAC/PHY functions with the information included in the peer link open frame.

The extended capability information element and the 20/40 BSS coexistence information element is used to notify that the HT MP supports both the communication using a 20 MHz channel and the communication using a 40 MHz channel in the mesh network. In another aspect of the invention, the extended capability information element may be optional information element that can be included in the peer link open frame only when the HT MP has a BSS coexistence management support attribute for supporting both the communication using the 20 MHz channel and the 40 MHz channel. In this case, the peer link open frame may include the 20/40 coexistence information element.

Figure 6:
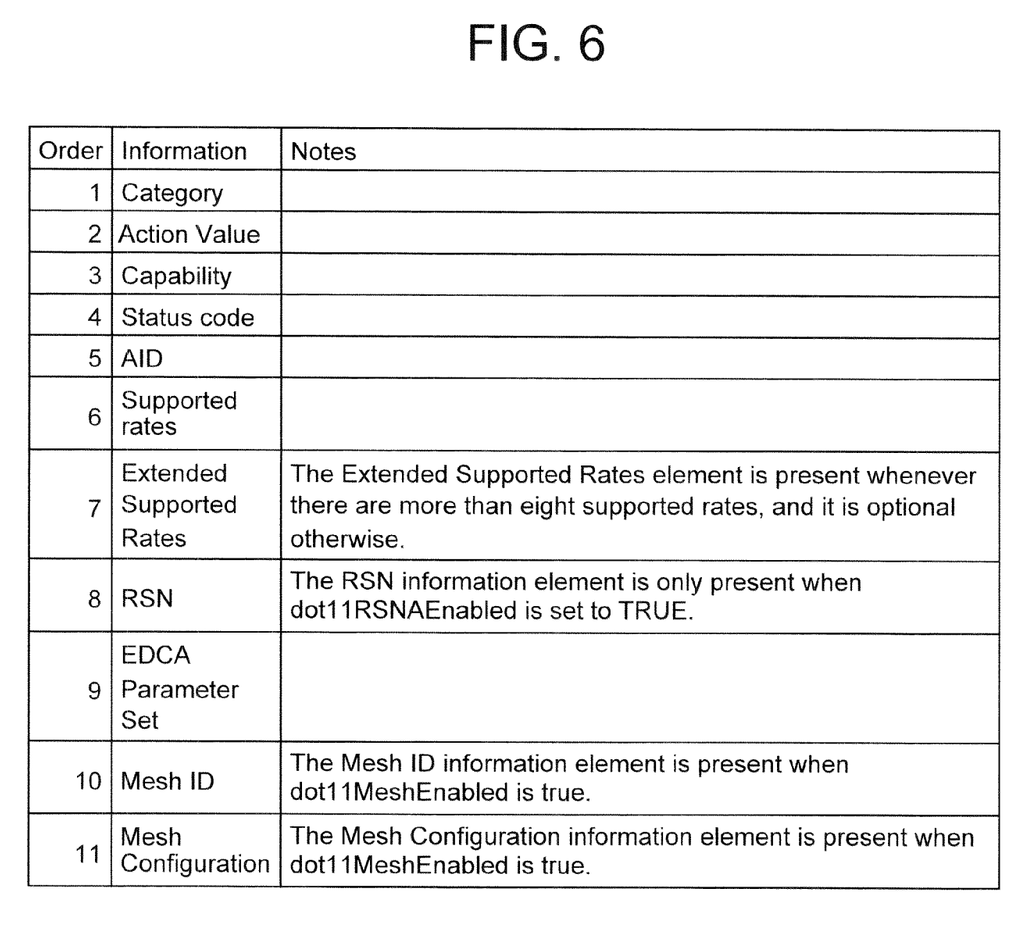
FIG. 6 is a diagram illustrating a part of information element included in a body portion of a peer link confirmation frame that is used for the mesh peer link setup procedure according to the embodiment of the invention.
Figure 7:
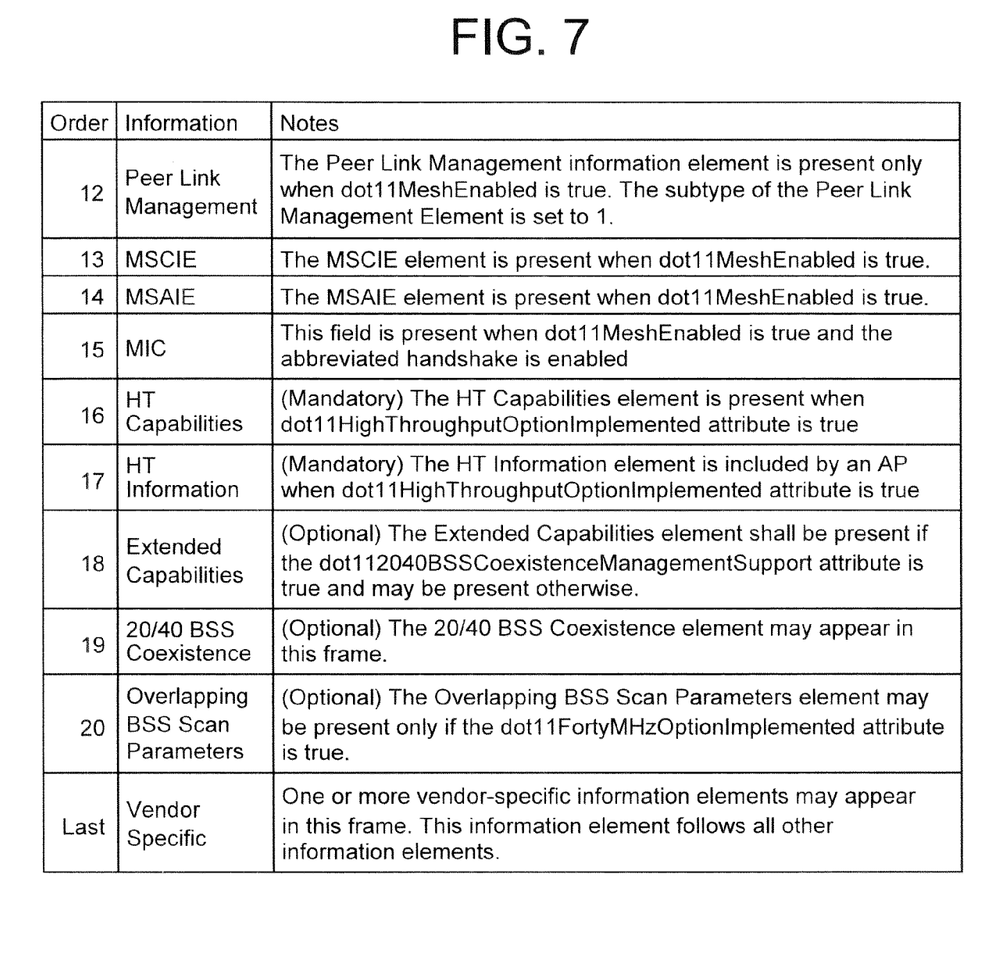
FIG. 7 is a diagram illustrating another part of information element included in the body portion of the peer link confirmation frame that is used for the mesh peer link setup procedure according to the embodiment of the invention.

FIGS. 6 and 7 are diagrams illustrating examples of information element included in a body portion of the peer link confirmation frame used in the mesh peer link setup procedure according to the embodiment of the invention. The peer link confirmation frame is a frame to be transmitted in response to the received peer link open frame and is used to confirm the reception of the mesh link open request.

Referring to FIGS. 6 and 7, the body portion of the peer link confirmation frame includes information on category, action value, capability, status code, association ID (AID), and supported rate. When a predetermined condition is satisfied, the body portion may further include information element on extended support rate, robust security network (RSN), enhanced distributed channel access (EDCA) parameter set, mesh ID, mesh configuration, peer link management, mesh security capability information element (MSCIE), mesh security association handshake information element (MSAIE), and message integration code.

When the MP transmitting the peer link confirmation frame is an MP supporting the HT PHY and MAC, that is, an HT MP, the body portion of the peer link confirmation frame includes the HT capability information element and the HT information element or HT operation information element and may further include the extended capability information element, the 20/40 BSS coexistence information element, and overlapping BSS scan parameter information element.

The HT capability information element and the HT information element are used to notify to the opposite MP that the HT MP supports the HT MAC and PHY and to notify the HT-related information to the opposite. In an aspect of this embodiment, the HT capability information element and the HT information element should be necessarily included in the peer link open frame to use the HT service in the mesh network. That is, the HT MP transmits to the opposite MP the HT capability information indicating that it supports the HT MAC/PHY functions and the HT information including its relevant information with the information included in the peer link confirmation frame.

The extended capability information element and the 20/40 BSS coexistence information element is used to notify that the HT MP supports both the communication using a 20 MHz channel and the communication using a 40 MHz channel in the mesh network. The overlapping BSS scan parameter information element is included only when the HT MP has the 40 MHz option executing attribute. In another aspect of the invention, the extended capability information element may be optional information that can be included in the peer link confirmation frame only when the HT MP has a BSS coexistence management support attribute for supporting both the communication using the 20 MHz channel and the 40 MHz channel. In this case, the peer link confirmation frame may include the 20/40 coexistence information element and the overlapping BSS scan parameter information element.

In the HT service, the 20 MHz channel and the 40 MHz channel can be selectively used. When the 40 MHz channel is selected for use, there may be a problem that the communication with the legacy MP supporting only the 20 MHz channel or the HT MP selectively using the 20 MHz channel is not smoothly made. Accordingly, in this embodiment, by allowing the peer link opening frame to include the extended capability information element and the 20/40 BSS coexistence information element and allowing the peer link confirmation frame transmitted in response to the peer link open frame to include the extended capability information element, the 20/30 BSS coexistence information element, and the overlapping BSS scan parameter information element, the HT service selectively using the 20 MHz and the 40 MHz channels is made to be usable in the mesh network.

That is, in this embodiment, the body portion of the peer link open frame is made to include the HT capability information element and the HT operation information element, and/or the extended capability information element and the 20/40 BSS coexistence information element as options, and the body portion of the peer link confirmation frame is made to include the HT capability information element and the HT operation information element and/or the extended capability information element, the 20/40 BSS coexistence information element and the overlapping BSS scan parameter information element.

In the above-mentioned embodiment of the invention, the HT MPs can utilize the HT service through the mesh peer links. In the past mesh link setup procedure, even when the parties setting up the mesh links are all the HT MPs, one party cannot acquire the information indicating whether the opposite party is an MP supporting the HT service and thus cannot utilize the HT service. However, according to the above-mentioned embodiment of the invention, by allowing the MPs to transmit and receive the HT-related information in the mesh link setup procedure, the MPs having set up the mesh peer links can utilize the HT service.

According to embodiments described above, the HT MP can utilize its HT facilities when it communicates with a peer MP through the mesh peer link. In the past mesh link setup procedure, even when all the MPs which have set up the mesh peer link are HT MPS, a MP cannot acquire information indicating whether the other MP is an MP supporting the HT capabilities and thus cannot utilize its HT facilities. However, according to the present invention, the HT MPs having set up the mesh peer link can utilize their HT facilities, by allowing the HT MPs to transmit and receive data at the rate of 100 Mbps.

The embodiments described above in detail are only examples explaining the technical spirit of the invention and it should be understood that the technical spirit is not limited to the embodiments. The scope of the invention is defined by the appended claims.

What is claimed is:

1. A method of establishing a peer link in a wireless mesh network, the method comprising:
   discovering, by a mesh point (MP), a candidate peer MP by receiving a beacon frame or a probe response frame from the candidate peer MP, the beacon frame or probe response frame including a mesh configuration element used to advertise mesh services and a mesh identifier (ID) that matches a mesh ID of the MP;

transmitting, by the MP, a peer link open frame to the candidate peer MP in order to request establishment of the peer link with the candidate peer MP, the peer link open frame including a mesh ID field indicating the mesh ID, a requested mesh configuration field indicating a mesh configuration supported by the MP's mesh profile, a high throughput (HT) capabilities field indicating operations associated with an HT service and an HT operation field indicating operations associated with the HT service;

receiving, by the MP, a peer link confirmation frame from the candidate peer MP in response to the peer link open frame; and establishing the peer link when the peer link confirmation frame includes fields that are set to same values as the mesh ID field, the requested mesh configuration field, the HT capabilities field and the HT operation field in the peer link open frame.

2. The method according to claim 1, wherein the HT service is a service supported by Institute of Electrical and Electronics Engineers (IEEE) 802.11n standard.

3. The method according to claim 1, wherein the peer link confirmation frame includes an extended capabilities field and a 20/40 BSS (Basic Service Set) coexistence field each of which is set to same values as corresponding fields in the peer link open frame.

4. The method according to claim 1, wherein the MP and the candidate peer MP are non-access point stations.

5. The method according to claim 1, wherein the probe response frame is received from the candidate peer MP in response to a probe request frame transmitted by the MP.

6. A wireless station for establishing a peer link in a wireless mesh network, the wireless station comprising:

a processor configured to generate and process frames; and
a transceiver operatively connected to the processor and configured to transmit and receive the frames under control of the processor,
wherein the processor is configured to:
discover a candidate peer mesh point (MP) by receiving a beacon frame or a probe response frame from the candidate peer MP, the beacon frame or the probe response frame including a mesh configuration element used to advertise mesh services and a mesh identifier (ID) that matches a mesh ID of the wireless station;
control the transceiver to transmit a peer link open frame to the candidate peer MP in order to request establishment of the peer link with the candidate peer MP, the peer link open frame including a mesh ID field indicating the mesh ID, a requested mesh configuration field indicating a mesh configuration supported by the MP's mesh profile, a high throughput (HT) capabilities field indicating capabilities associated with an HT service and an HT operation field indicating operations associated with the HT service;
receive a peer link confirmation frame from the candidate peer MP in response to the peer link open frame; and
establish the peer link when the peer link confirmation frame includes fields that are set to same values as the mesh ID field, the requested mesh configuration field, the HT capabilities field and the HT operation field in the peer link open frame.

* * * * *